(12) United States Patent
Takamatsu et al.

(10) Patent No.: US 10,424,777 B2
(45) Date of Patent: Sep. 24, 2019

(54) CATHODE ACTIVE MATERIAL FOR LITHIUM ION SECONDARY BATTERY, AND METHOD FOR ITS PRODUCTION

(71) Applicant: SUMITOMO CHEMICAL CO., LTD., Tokyo (JP)

(72) Inventors: Satoshi Takamatsu, Chigasaki (JP); Yukimitsu Wakasugi, Chigasaki (JP); Megumi Uchida, Chigasaki (JP)

(73) Assignee: SUMITOMO CHEMICAL CO., LTD., Tokyo (JP)

( * ) Notice: Subject to any disclaimer, the term of this patent is extended or adjusted under 35 U.S.C. 154(b) by 67 days.

(21) Appl. No.: 14/533,804

(22) Filed: Nov. 5, 2014

(65) Prior Publication Data

US 2015/0056511 A1 Feb. 26, 2015

Related U.S. Application Data

(63) Continuation of application No. PCT/JP2013/066744, filed on May 18, 2013.

(30) Foreign Application Priority Data

Jun. 21, 2012 (JP) ................. 2012-140230

(51) Int. Cl.
*H01M 4/1315* (2010.01)
*H01M 4/36* (2006.01)
(Continued)

(52) U.S. Cl.
CPC .......... *H01M 4/1315* (2013.01); *H01M 4/36* (2013.01); *H01M 4/364* (2013.01); *H01M 4/382* (2013.01);
(Continued)

(58) Field of Classification Search
CPC ........ H01M 4/36; H01M 4/505; H01M 4/525; H01M 2004/021; H01M 4/382; H01M 4/405; H01M 4/364; H01M 4/1315
(Continued)

(56) References Cited

U.S. PATENT DOCUMENTS

2005/0220700 A1 10/2005 Suhara et al.
2007/0099087 A1* 5/2007 Mihara .................. C01B 25/45
429/231.95
(Continued)

FOREIGN PATENT DOCUMENTS

JP 2006-310311 11/2006
JP 2008-532221 8/2008
(Continued)

OTHER PUBLICATIONS

International Search Report issued in corresponding PCT/JP2013/066744, dated Sep. 24, 2013.

*Primary Examiner* — Jonathan G Jelsma
*Assistant Examiner* — Omar M Kekia
(74) *Attorney, Agent, or Firm* — Oblon, McClelland, Maier & Neustadt, L.L.P.

(57) ABSTRACT

To provide a cathode active material for a lithium ion secondary battery, which has high packing properties and high volume capacity density, and a method for its production. A cathode active material for a lithium ion secondary battery is used, which comprises a mixture B of a collection of many large particles having different particle sizes and a collection of many small particles having different particle sizes, wherein the function F(x) of a particle size x of a particle contained in the mixture B and its frequency F has a relation of the formula 1, the function E(x) of a particle size x of a particle contained in a mixture B' after the mixture
(Continued)

B is pressed and its frequency E has a relation of the formula 2, the rate of change of the median size $\mu'_g$ relative to $\mu_g$ is at most 10%, and the rate of change of the median size $\mu'_h$ relative to $\mu_h$ is at least 20%, $$F(x) = A_g \times \frac{1}{\sqrt{2\pi}\,\sigma_g x}\exp\left\{-\frac{(\log x - \mu_g)^2}{2\sigma_g^2}\right\} + A_h \times \frac{1}{\sqrt{2\pi}\,\sigma_h x}\exp\left\{-\frac{(\log x - \mu_h)^2}{2\sigma_h^2}\right\} \quad \text{Formula 1}$$

$$E(x) = A'_g \times \frac{1}{\sqrt{2\pi}\,\sigma'_g x}\exp\left\{-\frac{(\log x - \mu'_g)^2}{2\sigma'^2_g}\right\} + A'_h \times \frac{1}{\sqrt{2\pi}\,\sigma'_h x}\exp\left\{-\frac{(\log x - \mu'_h)^2}{2\sigma'^2_h}\right\} \quad \text{Formula 2}$$

14 Claims, 1 Drawing Sheet

(51) Int. Cl.
*H01M 4/38* (2006.01)
*H01M 4/40* (2006.01)
*H01M 4/505* (2010.01)
*H01M 4/525* (2010.01)
*H01M 4/02* (2006.01)

(52) U.S. Cl.
CPC ............ *H01M 4/405* (2013.01); *H01M 4/505* (2013.01); *H01M 4/525* (2013.01); *H01M 2004/021* (2013.01)

(58) Field of Classification Search
USPC ... 429/218.1, 223, 231.1, 231.3, 231.5, 221; 252/182.1
See application file for complete search history.

(56) References Cited

U.S. PATENT DOCUMENTS

| | | |
|---|---|---|
| 2010/0040949 A1 | 2/2010 | Nanno et al. |
| 2013/0106029 A1* | 5/2013 | Snyder .................. H01M 4/043 264/571 |

FOREIGN PATENT DOCUMENTS

| | | |
|---|---|---|
| JP | 2008-214186 | 9/2008 |
| JP | 2008-234872 | 10/2008 |
| JP | 2009-146788 | 7/2009 |
| JP | 2010-532075 | 9/2010 |
| JP | 2010-262826 | 11/2010 |
| WO | 2004/082046 | 9/2004 |
| WO | 2005/020354 | 3/2005 |
| WO | 2005/124898 | 12/2005 |

\* cited by examiner

CATHODE ACTIVE MATERIAL FOR LITHIUM ION SECONDARY BATTERY, AND METHOD FOR ITS PRODUCTION

TECHNICAL FIELD

The present invention relates to a cathode active material to be used for a lithium ion secondary battery, and a method for its production.

BACKGROUND ART

In recent years, along with the progress in the portability and codeless tendency of electronic instrument, a demand for a non-aqueous electrolyte secondary battery which is small in size and light in weight and has a high capacity and high energy density, has been increasingly high. As a cathode active material for the non-aqueous electrolyte secondary battery, a composite oxide of lithium and a transition metal, such as $LiCoO_2$, $LiNiO_2$, $LiNi_{0.8}Co_{0.2}O_2$, $LiMn_2O_4$ or $LiMnO_2$, has been known.

Particularly, a lithium secondary battery using lithium cobalt composite oxide ($LiCoO_2$) as a cathode active material and using a lithium alloy, graphite, carbon fiber, a silicon alloy or the like as a negative electrode, is widely used as a battery having a high energy density, since a high voltage at a level of 4 V can thereby be obtainable.

However, for a non-aqueous electrolyte secondary battery for consumer application, further improvement in the discharge capacity per unit volume of the positive electrode plate (which may be referred to as a volume capacity density in this specification), i.e. higher energy densification, is desired.

In order to obtain a lithium ion secondary battery having a high energy density, the positive electrode is required to have a high electrode density. In order to improve the electrode density, the tap density or pressed density is regarded as a proper index, and especially, the pressed density is regarded as highly interrelated with the electrode density.

With respect to such packing properties, the following various studies have been made. For example, in Patent Document 1, it is stated that factors influential to the tap density or pressed density of a cathode active material, are the shapes of particles, and the sizes and particle size distribution of primary particles. Further, it is disclosed that the average particle size of $LiCoO_2$ to be used for industrial application is from 1 to 20 μm, and the larger the average particle size, the higher the pressed density.

Patent Documents 2 to 5 disclose a mixed powder having a wide particle size distribution, wherein a powder composed of particles having large particle sizes and a powder composed of particles having small particle sizes are mixed. Further, it is disclosed that by using such a mixed powder, it is possible to improve the packing properties, since small particles will enter into spaces among large particles. Particularly, it is disclosed that it is possible to obtain a cathode active material having high packing properties by mixing two types of active material powders which are substantially different in the particle sizes.

Further, Patent Document 6 discloses that it is possible to obtain a cathode active material which has a high electrode density and is excellent in the slurry and electrode coating uniformity and which has good electrochemical properties, by regulating the particle size distribution of a powder of the cathode active material and by using a powder having a specific sharp particle size distribution where particles of the powder are not excessively large and not excessively small.

Furthermore, Patent Documents 7 to 9 disclose that by using a powder having a specific crushing strength as a powder of a cathode active material, or controlling the state of its presence in the powder layer, it is possible to improve the packing properties of the powder when a compressive stress is exerted to the powder.

PRIOR ART DOCUMENTS

Patent Documents

Patent Document 1: JP-A-2010-532075
Patent Document 2: JP-A-2008-532221
Patent Document 3: JP-A-2008-234872
Patent Document 4: JP-A-2009-146788
Patent Document 5: JP-A-2006-310311
Patent Document 6: JP-A-2008-214186
Patent Document 7: WO-2005/124898
Patent Document 8: WO-2005/020354
Patent Document 9: JP-A-2010-262826

DISCLOSURE OF INVENTION

Technical Problems

Although various proposals have been made to improve the battery performance including improvement in the density of a cathode active material, a lithium composite oxide capable of bringing about sufficient battery performance has not yet been obtained.

In Patent Document 1, it is disclosed to produce a cathode active material by adding lithium in excess of its stoichiometrical amount, by firing in an oxygen-containing atmosphere, or by adding a very small amount of an additive element, in order to control the shape of particles and the size of primary particles by letting primary particles grow. It is considered that large particles have a less interface for reaction, whereby a side reaction such as a decomposition reaction is less likely to occur, and also from the viewpoint of properties other than the electrode density, such as the safety, etc., the particle size of the powder should better be large. However, if primary particles are permitted to grow excessively so that the size of primary particles becomes excessively large, the specific surface area will become small, and the reaction interface of particles and an electrolyte as a pathway for lithium ions will also become small, whereby the intercalation reaction rate of lithium will decrease at the same time, such being undesirable.

Further, the method of using a mixed powder having a wide particle size distribution, wherein a powder composed of particles having large particle sizes and a powder composed of particles having small particle sizes are merely mixed, as disclosed in Patent Documents 2 to 5, has a problem such that it is thereby not possible to obtain a volume capacity density which is required for consumer application in recent years. Also with respect to the particles having small particle sizes, if excessively fine particles are used, the specific surface area of the cathode active material will increase and a side reaction is likely to proceed, whereby an adverse effect is likely to be given to safety, and the handling efficiency of the powder also tends to be poor, thus leading to deterioration in the mass productivity.

Further, the method of using a powder having a specific sharp particle size distribution as disclosed in Patent Document 6 has a problem such that it is not possible to obtain a sufficient volume capacity density which is required for consumer application.

The methods disclosed in Patent Documents 7 to 9 have a problem such that at the time of pressing, particles having small particle sizes are likely to be crushed to form a finer powder with very small particle sizes, whereby the cycle properties and safety tend to be low, and besides, the packing properties tend to be low.

Under the circumstances, it is an object of the present invention to provide a cathode active material for a lithium ion secondary battery having high packing properties and high volume capacity density, and a method for its production.

Solution to Problems

The present inventors have conducted an extensive study and as a result, have found it possible to accomplish the above object by an invention having the following constructions.

(1) A cathode active material for a lithium ion secondary battery, which comprises a mixture B of a collection of many large particles having different particle sizes and a collection of many small particles having different particle sizes, wherein the function F(x) of a particle size x of a particle contained in the mixture B and its frequency F has a relation of the formula 1 (provided that in the formula 1, in the collection of the large particles, the median size $\mu_g$ is 10 $\mu m \le \mu_g \le 30$ $\mu m$ and the standard deviation $\sigma_g$ is $1.16 \le \sigma_g \le 1.65$, in the collection of the small particles, the median size $\mu_h$ is 0.1 $\mu m \le \mu_h < 10$ $\mu m$ and the standard deviation a is $1.16 \le \sigma_h \le 1.65$, $A_g + A_h = 1$, $0 < A_g < 1$, $0 < A_h < 1$, and $1 \le A_g/A_h \le 9$), the function E(x) of a particle size x of a particle contained in a mixture B' after the mixture B is pressed by 1.92 t/cm² and its frequency E has a relation of the formula 2 (provided that in the formula 2, in the collection of the large particles, the median size $\mu'_g$ is 10 $\mu m \le \mu'_g \le 30$ $\mu m$ and the standard deviation $\sigma'_g$ is $1.16 \le \sigma'_g \le 1.65$, in the collection of the small particles, the median size $\mu'_h$ is 0.1 $\mu m \le \mu'_h < 10$ $\mu m$ and the standard deviation $\sigma'_h$ is $1.16 \le \sigma'_h \le 1.65$, $A'_g + A'_h = 1$, $0 < A'_g < 1$, $0 < A'_h < 1$, and $1 \le A'_g/A'_h \le 9$), the rate of change of the median size $\mu'_g$ relative to $\mu_g$ is at most 10%, and the rate of change of the median size $\mu'_h$ relative to $\mu_h$ is at least 20%, $$F(x) = A_g \times \frac{1}{\sqrt{2\pi}\,\sigma_g x}\exp\left\{-\frac{(\log x - \mu_g)^2}{2\sigma_g^2}\right\} + A_h \times \frac{1}{\sqrt{2\pi}\,\sigma_h x}\exp\left\{-\frac{(\log x - \mu_h)^2}{2\sigma_h^2}\right\} \quad \text{Formula 1}$$

$$E(x) = A'_g \times \frac{1}{\sqrt{2\pi}\,\sigma'_g x}\exp\left\{-\frac{(\log x - \mu'_g)^2}{2\sigma'^2_g}\right\} + A'_h \times \frac{1}{\sqrt{2\pi}\,\sigma'_h x}\exp\left\{-\frac{(\log x - \mu'_h)^2}{2\sigma'^2_h}\right\} \quad \text{Formula 2}$$

(2) The cathode active material for a lithium ion secondary battery according to the above (1), wherein the porosity when the cathode active material is pressed by 1.92 t/cm² is from 15 to 25%.

(3) The cathode active material for a lithium ion secondary battery according to the above (1) or (2), wherein the cathode active material is a lithium composite oxide having a composition represented by $Li_pNi_xCo_yMn_zM_qO_rF_a$ (wherein M is at least one element selected from the group consisting of Al, Group 2 elements and transition metal elements other than Ni, Co and Mn, and p, x, y, z, q, r and a satisfy $0.9 \le p \le 1.5$, $0 \le x \le 0.8$, $0 \le y \le 1.0$, $0 \le z \le 0.5$, $0 \le q \le 0.1$, $1.9 \le r \le 2.1$ and $0 \le a \le 0.1$, respectively).

(4) The cathode active material for a lithium ion secondary battery according to any one of the above (1) to (3), wherein the cathode active material has a specific surface area of from 0.2 to 1.5 m²/g.

(5) The cathode active material for a lithium ion secondary battery according to any one of the above (1) to (4), wherein the cathode active material has an alkali content of from 0.1 to 1.5 mol %.

(6) The cathode active material for a lithium ion secondary battery according to any one of the above (1) to (5), wherein when the cathode active material is pressed by 1.92 t/cm², the volume cumulative fraction of particles having particle sizes of at most 0.75 μm is at most 1.5%.

(7) The cathode active material for a lithium ion secondary battery according to any one of the above (1) to (6), wherein the rate of change of the median size $\mu'_g$ relative to $\mu_g$ is from 0.5 to 5%, and the rate of change of the median size $\mu'_h$ relative to $\mu_h$ is from 20 to 80%.

(8) A method for producing the cathode active material for a lithium ion secondary battery as defined in any one of the above (1) to (7), which comprises mixing a powder P which is a collection of plural particles having different particle sizes and which is made of large particle size lithium composite oxide, wherein the function I(x) of a particle size x of a particle contained in the powder P and its frequency I has a relation of the formula 3 (provided that in the formula 3, the median size $\mu_i$ is 10 $\mu m \le \mu_i \le 30$ $\mu m$ and the standard deviation $\sigma_i$ is $1.16 \le \sigma_i \le 1.65$), with respect to a powder P' after the powder P is pressed by 1.92 t/cm², the function N(x) of a particle size x of a particle contained in the powder P' and its frequency N has a relation of the formula 4 (provided that in the formula 4, in the collection of the large particles, the median size $\mu'_i$ is 10 $\mu m \le \mu'_i \le 30$ $\mu m$ and the standard deviation $\sigma'_i$ is $1.16 \le \sigma'_i \le 1.65$), and the rate of change of the median size $\mu'_i$ relative to $\mu_i$ is at most 10%, and a powder Q which is a collection of plural particles having different particle sizes and which is made of small particle size lithium composite oxide, wherein the function J(x) of a particle size x of a particle contained in the powder Q and its frequency J has a relation of the formula 5 (provided that in the formula 5, the median size $\mu_j$ is 0.1 $\mu m \le \mu_j < 10$ $\mu m$ and the standard deviation $\sigma_j$ is $1.16 \le \sigma_j \le 1.65$), with respect to a powder Q' after the powder Q is pressed by 1.92 t/cm², the function L(x) of a particle size x of a particle contained in the powder Q' and its frequency L has a relation of the formula 6 (provided that in the formula 6, in the collection of the small particles, the median size $\mu'_j$ is 0.1 $\mu m \le \mu'_j < 10$ $\mu m$ and the standard deviation $\sigma'_j$ is $1.16 \le \sigma'_j \le 1.65$), and the rate of change of the median size $\mu'_j$ relative to $\mu_j$ is at least 20%, so that their weight mixing ratio would be within a range of from 90:10 to 50:50, $$I(x) = \frac{1}{\sqrt{2\pi}\,\sigma_i x}\exp\left\{-\frac{(\log x - \mu_i)^2}{2\sigma_i^2}\right\} \quad \text{Formula 3}$$

$$N(x) = \frac{1}{\sqrt{2\pi}\,\sigma'_i x}\exp\left\{-\frac{(\log x - \mu'_i)^2}{2\sigma'^2_i}\right\} \quad \text{Formula 4}$$

$$J(x) = \frac{1}{\sqrt{2\pi}\,\sigma_j x}\exp\left\{-\frac{(\log x - \mu_j)^2}{2\sigma_j^2}\right\} \quad \text{Formula 5}$$

$$L(x) = \frac{1}{\sqrt{2\pi}\,\sigma'_j x}\exp\left\{-\frac{(\log x - \mu'_j)^2}{2\sigma'^2_j}\right\} \quad \text{Formula 6}$$

(9) A method for producing the cathode active material for a lithium ion secondary battery as defined in any one of the above (1) to (7), which comprises mixing a large particle size raw material C which comprises at least one compound selected from a nickel compound, a cobalt compound and a manganese compound and which is a collection of many large particles having different particle sizes, wherein the function K(x) of a particle size x of a particle contained in the large particle size raw material C and its frequency K has a relation of the formula 7 (provided that in the formula 7, the median size $\mu_k$ is 10 $\mu m \leq \mu_k \leq 30$ $\mu m$ and the standard deviation $\sigma_k$ is $1.16 \leq \sigma_k \leq 1.65$), the function R(x) of a particle size x of a large particle size raw material C' after the large particle size raw material C is pressed by 1.92 t/cm² and its frequency R has a relation of the formula 8 (provided that in the formula 8, the median size $\mu'_k$ is 10 $\mu m \leq \mu'_k \leq 30$ $\mu m$ and the standard deviation $\sigma'_k$ is $1.16 \leq \sigma'_k \leq 1.65$), and the rate of change of the median size $\mu'_k$ relative to $\mu_k$ is at most 10%, and a small particle size raw material D which comprises at least one compound selected from a nickel compound, a cobalt compound and a manganese compound and which is a collection of many small particles having different particle sizes, wherein the function M(x) of a particle size x of a particle contained in the small particle size raw material D and its frequency M has a relation of the formula 9 (provided that in the formula 9, the median size $\mu_{is}$ 0.1 $\mu m \leq \mu_m < 10$ $\mu m$ and the standard deviation $\sigma_m$ is $1.16 \leq \sigma_m \leq 1.65$), the function S(x) of a particle size x of a particle contained in a small particle size raw material D' after the small particle size raw material D is pressed by 1.92 t/cm² and its frequency S has a relation of the formula 10 (provided that in the formula 10, the median size $\mu'_m$ is 0.1 $\mu m \leq \mu'_m \leq 10$ $\mu m$ and the standard deviation $\sigma'_m$ is $1.16 \leq \sigma'_m \leq 1.65$), and the rate of change of the median size $\mu'_m$ relative to $\mu m$ is at least 20%, so that their weight mixing ratio would be within a range of from 90:10 to 50:50, then mixing a lithium compound thereto to obtain a mixture, and firing the mixture at a temperature of from 700 to 1,050° C., $$K(x) = \frac{1}{\sqrt{2\pi}\,\sigma_k x}\exp\left\{-\frac{(\log x - \mu_k)^2}{2\sigma_k^2}\right\} \quad \text{Formula 7}$$

$$R(x) = \frac{1}{\sqrt{2\pi}\,\sigma'_k x}\exp\left\{-\frac{(\log x - \mu'_k)^2}{2\sigma'^2_k}\right\} \quad \text{Formula 8}$$

$$M(x) = \frac{1}{\sqrt{2\pi}\,\sigma_m x}\exp\left\{-\frac{(\log x - \mu_m)^2}{2\sigma_m^2}\right\} \quad \text{Formula 9}$$

$$S(x) = \frac{1}{\sqrt{2\pi}\,\sigma'_m x}\exp\left\{-\frac{(\log x - \mu'_m)^2}{2\sigma'^2_m}\right\} \quad \text{Formula 10}$$

Advantageous Effects of Invention

According to the present invention, a cathode active material for a lithium ion secondary battery, which has high packing properties and high volume capacity density, and a method for its production, can be provided.

In the present invention, the mechanism whereby a cathode active material for a lithium ion secondary battery, which has high packing properties and high volume capacity density, is obtainable, is not necessarily clearly understood, but is considered to be as follows.

The cathode active material of the present invention is characterized by using a powder which comprises a mixture B of a collection of many large particles having different particle sizes and a collection of many small particles having different particle sizes, and which has such a particle size distribution that the function F(x) of a particle size x of a particle contained in the mixture B and its frequency F satisfies the formula 1 and as between before and after pressing the mixture B of a collection of the large particles and a collection of the small particles, the change in the average particle size $\mu_g$ of the collection of the large particles, is small, and the change in the average particle size $\mu_h$ of the collection of the small particles is large. That is, by using, as a positive electrode material, a mixed powder comprising a collection of hardly crushable large particles and a collection of readily crushable small particles, at the time of pressing the mixed powder, only the small particles are selectively disintegrated from agglomeration to form a finer powder. It is considered that this finer powder is filled in spaces among large particles, whereby a powder of a lithium composite oxide having a high density is obtainable.

On the other hand, in a powder having large particles and small particles mixed, as used in the prior art, the packing properties may be improved to a certain extent, but particles after the pressing are filled in random alignment (which may be referred to as random packing in this specification), whereby sufficiently high packing properties are not obtainable. Further, at the time of pressing, small particles are likely to be crushed, whereby although the packing properties may be improved, an active interface with high reactivity with the electrolyte is exposed anew on the surface of small particles, and at the time of being used as a positive electrode material, the electrolyte will be thereby decomposed, thus leading to deterioration of the battery properties such as the cycle properties.

In the present invention, it is considered that small particles are disintegrated from agglomeration only at portions where spaces are present at the time of pressing the powder, and are present as agglomerated particles at other portions, whereby highly efficient packing takes place. Here, improvement of the packing properties due to disintegration of agglomerated particles is different from improvement of the packing properties due to crushing of particles, in that an active interface will not be exposed anew and further, the particles will not become excessively small, and therefore, the battery properties will be further improved as compared with a case where the packing properties are improved by conventional crushing of particles.

DESCRIPTION OF EMBODIMENTS

The cathode active material of the present invention comprises a mixture B of a collection of many large particles having different particle sizes and a collection of many small particles having different particle sizes, and the function F(x) of a particle size x of a particle contained in the mixture B and its frequency F has a relation of the above formula 1.

The function F(x) represented by the formula 1, is an addition formula of two lognormal distribution functions and consists of the first term defining the particle size distribution of the collection of the large particles and the second term defining the particle size distribution of the collection of the small particles. Each log in the formula 1 is a natural logarithm, and the base of this log is Napier's number e. Likewise, each log in the formulae 2 to 10 is a natural logarithm, and the base is Napier's number e. Further, $\mu_g$ in the formula 1 is the median size in the collection of the large particles, $\sigma_g$ is the standard deviation in the collection of the large particles, $A_g$ is a coefficient of the first term in the formula 1, $\mu_h$ is the median size in the collection of the small particles, $\sigma_h$ is the standard deviation in the collection of the small particles, and $A_h$ is a coefficient of the second term in the formula 1.

Further, in the present invention, as defined in the formula 1, the median size $\mu_g$ is 10 $\mu m \leq \mu_g \leq 30$ $\mu m$, the standard deviation $\sigma_g$ is $1.16 \leq \sigma_g \leq 1.65$, the median size $\mu_h$ is 0.1 $\mu m \leq \mu_h < 10$ $\mu m$, the standard deviation $\sigma_h$ is $1.16 \leq \sigma_h \leq 1.65$, $A_g + A_h = 1$, $0 < A_g < 1$, $0 < A_h < 1$, and $1 \leq A_g/A_h \leq 9$.

Further, in the present invention, a mixture B' after the above mixture B is pressed by 1.92 t/cm$^2$ is such that the function E(x) of a particle size x of a particle contained in the mixture B' and its frequency E has a relation of the formula 2, and as defined in the formula 2, the median size $\mu'_g$ is 10 $\mu m \leq \mu'_g \leq 30$ $\mu m$, the standard deviation $\sigma'_g$ is $1.16 \leq \sigma'_g \leq 1.65$, the median size $\mu'_h$ is 0.1 $\mu m \leq \mu'_h \leq 10$ $\mu m$ and the standard deviation $\sigma'_h$ is $1.16 \leq \sigma'_h \leq 1.65$, $A'_g + A'_h = 1$, $0 < A'_g < 1$, $0 < A'_h < 1$, and $1 \leq A'_g/A'_h \leq 9$.

Coefficients such as $A_g$, $A_h$, $A'_g$ and $A'_h$ in the formulae 1 and 2 are indices representing mixing ratios of the collection of the large particles and the collection of the small particles. The larger the coefficient, the higher the proportion of the powder. However, the coefficients are ones derived from values measured by volume-based particle size distribution measurements by a laser scattering particle size distribution measuring apparatus, and thus, they may not completely agree to the weight mixing ratios.

The particle size distribution of the cathode active material of the present invention, represented by the F(x) of the formula 1, is obtainable from frequency distribution measured by a laser scattering particle size distribution measuring apparatus and a cumulative volume distribution curve. Here, in the present invention, a powder to be measured is put in an aqueous medium and sufficiently dispersed by e.g. ultrasonic treatment, whereupon the particle size distribution, particle size, etc. can be measured. Further, in each measurement of the particle size distribution and particle size, Microtrac HRAX-100 manufactured by Nikkiso Co., Ltd. can be used as the measuring apparatus.

$\mu_g$, $\sigma_g$, $A_g$, $\mu_h$, $\sigma_h$ and $A_h$ in the formula 1 are obtainable from the particle size distribution F(x) of the powder of the cathode active material, as follows. Firstly, the particle size distribution is measured by the above-mentioned method, whereby particle sizes $x_1, x_2, x_3 \ldots x_{100}$ as the particle size x, and frequencies $F_1, F_2, F_3 \ldots F_{100}$ corresponding to such particle sizes, are obtainable. Then, LOGNORMDIST function of Microsoft Office Excel (manufactured by Microsoft) is used. This LOGNORMDIST function is a function whereby when a particle size $x_n$, a median size $\mu$ and a standard deviation $\sigma$ are input, a cumulative frequency at the particle size $x_n$ can be calculated. Here, n is a natural number of from 1 to 100.

Here, assuming that $\mu_g$ is a particle size at the peak in the particle size distribution obtained by the measurement, log $\sigma_g$ is 0.5, $A_g$ is 0.5, and x is the above $x_1, x_2, x_3 \ldots x_{100}$, the cumulative frequency at each particle size $x_1, x_2, x_3 \ldots x_{100}$ is obtainable. As $\mu_g$ being a particle size at the peak in the particle size distribution obtained by the measurement, any numerical value of from 10 to 30 $\mu m$, e.g. 15 $\mu m$, may hypothetically to be input to carry out the calculation. From the difference between the cumulative frequency of $x_n$ and the cumulative frequency of $x_{n-1}$, thus calculated, the frequency at $x_n$ is obtainable. Hereinafter, in the present invention, this frequency will be referred to as $G_g(x_n)$. Here, at $x_{111}$, the value of frequency $F_1$ at $x_1$ is used as it is, without calculating a difference.

Further, in the same manner, also with respect to $\mu_h$, $\sigma_h$ and $A_h$, on the assumption that $\mu_h$ is an optional value of at least 0.1 $\mu m$ to less than 10 $\mu m$, log $\sigma_h$ is 0.5 and $A_h$ is 0.5, and x is the above $x_1, x_2, x_3 \ldots x_{100}$, the cumulative frequency at each particle size $x_1, x_2, x_3 \ldots x_{100}$ is obtainable. Further, from the difference between the cumulative frequency of $x_n$ and the cumulative frequency of $x_{n-1}$, thus calculated, the frequency at $x_n$ is obtainable. Hereinafter, in the present invention, this frequency will be referred to as $H_h(x_n)$.

Then, a value $V_n$ is obtained which is a squared value of the difference between $F(x_n)$ of the actually measured particle size distribution and the total value of frequencies at each x i.e. frequencies $G_g(x_n)$ and $H_h(x_n)$ at $x_1, x_2, x_3 \ldots x_{100}$. Further, a value having the respective $V_n$ at from $x_1$ to $x_{100}$ totaled, is obtained.

Then, using a solver function of Microsoft Office Excel (manufactured by Microsoft), selecting the total value of $V_n$ for an objective cell, selecting $\mu_g$, $\sigma_g$, $A_g$, $\mu_h$ and $\sigma_h$ for a cell to be changed, setting $A_h$ to be $1-A_g$ and, as a restrictive condition, limiting $\mu_g$, $\sigma_g$, $A_g$, $\mu_h$, and $\sigma_h$ to be at least 0, $\mu_g$, $\sigma_g$, $A_g$, $\mu_h$, $\sigma_h$ and $A_h$ can be obtained by calculating numerical values whereby the total value of $V_n$ set to be the target value would be minimum. Here, in order to define the particle size distribution function F(x) more accurately, it is preferred that the total value of $V_n$ is at most 1.0.

Further, the powder of the cathode active material of the present invention is characterized in that when the mixture B of the collection of the large particles and the collection of the small particles is pressed by a pressure of 1.92 t/cm$_2$, the rate of change in the median size $\mu_g$ is at most 10%, and the rate of change in the median size $\mu_h$ is at least 20%. With respect to such rates of change in $\mu_g$ and $\mu_h$, the powder of the cathode active material is pressed by a pressure of 1.92 t/cm$_2$, and the particle size distribution of the powder of the cathode active material obtainable after the pressing, is measured, whereupon from each particle size x of obtained $x_1, x_2, X_3 \ldots x_{100}$ and frequency $E_1, E_2, E_3 \ldots E_{100}$ corresponding to such a particle size, $\mu'_g$ and $\mu'_h$ after the pressing are calculated by using the formula 2 in the same manner, whereby the rates of change in $\mu_g$ and $\mu_h$ are obtainable.

In the collection of the large particles, the median size $\mu_g$ is 10 $\mu m \leq \mu_g \leq 30$ $\mu m$, particularly preferably 12 $\mu m \leq \mu_g \leq 20$ $\mu m$, and in the collection of the small particles, the median size $\mu_h$ is 0.1 $\mu m \leq \mu_h < 10$ $\mu m$, preferably 1 $\mu m \leq \mu_h < 10$ $\mu m$, more preferably 4 $\mu m \leq \mu_h < 10$ $\mu m$.

In the present invention, in a cumulative curve with the entire volume being 100% as measured based on the volume, the median size is a particle size at a point where the cumulative curve becomes 50% i.e. a particle size at a point of volume-based cumulative 50% size (D50). This particle size distribution is obtainable from a cumulative volume distribution curve and a frequency distribution measured by a laser scattering particle size distribution measuring apparatus.

The rate of change in the median size $\mu_g$ in the collection of the large particles after being pressed by 1.92 t/cm², is at most 10%, particularly preferably at most 5%. The lower limit for the rate of change is not particularly limited, but is usually preferably 1%, more preferably 0.5%. Whereas, the rate of change in the median size $\mu_h$ in the collection of the small particles after being pressed by 1.92 t/cm², is preferably at least 20%, more preferably at least 40%, particularly preferably at least 50%. The upper limit for the rate of change is not particularly limited, but is usually preferably 80%.

Further, the change by the pressing in the median size $\mu_g$ in the collection of the large particles is preferably at most 1 µm, more preferably at most 0.7 µm. Whereas, the change by the pressing in the median size $\mu_h$ in the collection of the small particles is preferably at least 2 µm, more preferably at least 2.5 µm.

Further, after being pressed by 1.92 t/cm², the median size $\mu'_g$ in the collection of the large particles is 10 µm≤$\mu'_g$≤30 µm, preferably 10 µm≤$\mu'_g$≤20 µm. In the collection of the small particles, the median size $\mu'_h$ is 0.1 µm≤$\mu'_h$<10 µm, preferably 0.1 µm≤$\mu'_h$≤8 µm, more preferably 1 µm≤$\mu'_h$≤7 µm. Further, the difference "$\mu'_g-\mu'_h$" between $\mu'_g$ and $\mu'_h$ is preferably at least 10 µm, more preferably at least 12 µm. Furthermore, the difference "$\mu'_g-\mu'_h$" between $\mu'_g$ and $\mu'_h$ is preferably at most 20 µm, more preferably at most 15 µm. More specifically, it is preferably within a range of 10 µm≤$\mu'_g-\mu'_h$≤20 µm, more preferably within a range of 12 µm≤$\mu'_g-\mu'_h$≤15 µm.

In the present invention, many large particles having different particle sizes and many small particles having different particle sizes are such that each of the large particles and the small particles itself is a secondary particle having plural primary particles as fine particles agglomerated. The number of fine particles to constitute the secondary particle depends also on the size of the secondary particle, but in a large particle, primary particles are preferably at a level of from 20 to a few tens of thousands, and in a small particle, primary particles are preferably at a level of from a few to ten thousands.

At the time when the powder of the cathode active material is pressed by 1.92 t/cm², the porosity of the powder is preferably from 15 to 25%, more preferably from 18 to 24%. In the present invention, the porosity of the powder after the pressing is obtained by dividing an apparent density at the time when the powder is actually pressed by 1.92 t/cm², by the true density. This true density can be calculated from the crystal structure of the cathode active material to be measured, lattice constants a and c obtainable by powder X-ray diffraction, and the formula weight of the cathode active material. For example, when the crystal structure is a hexagonal crystal structure, the true density D can be obtained by the following formula 11, wherein a is the lattice constant of a-axis, c is the lattice constant of c-axis, M is the molecular weight of the cathode active material, and $N_A$ is the Avogadro's number.

$$D = \frac{\frac{3}{N_A} \times M}{\frac{\sqrt{3}}{2} \times a^2 c} \qquad \text{Formula 11}$$

In the present invention, the above lattice constants a and c can be obtained from a spectrum obtained by a powder X-ray diffraction measurement using CuKα-ray. For the measurement, RINT 2100 model, manufactured by Rigaku Corporation, may be used. Specifically, the measurement can be carried out under such conditions that the applied voltage is 40 KV, the current is 40 mA, the scanning range is from 15 to 75°, the sampling width is 0.020, the scanning speed is 2,000°/min., the diffusion slit is 1°, the diffusion vertical-limiting slit is 10 mm, the scattering slit is 1°, and the light-receiving slit is 0.15 mm.

With the cathode active material of the present invention, as mentioned above, improvement of the packing properties due to disintegration of agglomerated particles is different from improvement of the packing properties due to crushing of particles, in that an active interface will not be exposed anew and further, the particles will not become excessively small, and therefore, the charge and discharge cycle properties or the safety will be improved. That is, it has a characteristic such that after being pressed by a pressure of 1.92 t/cm², the volume cumulative fraction of fine particles is low. Specifically, when the cathode active material is pressed by 1.92 t/cm², the volume cumulative fraction of particles having particle sizes of at most 0.75 µm is preferably at most 1.5%, more preferably at most 1.2%, particularly preferably 0%.

The pressed density of the powder of the cathode active material of the present invention is preferably from 3.40 to 4.00 g/cm³, more preferably from 3.50 to 3.80 g/cm³, particularly preferably from 3.60 to 3.75 g/cm³. In the present invention, the pressed density means an apparent density of the powder, when the powder of the cathode active material is pressed by a pressure of 1.92 t/cm².

Further, the composition of the cathode active material for a lithium ion secondary battery of the present invention is not particularly limited, but is specifically represented by $Li_pNi_xCo_yMn_zM_qO_rF_a$. Here, M is at least one element selected from the group consisting of Al, Group 2 elements and transition metal elements other than Ni, Co and Mn. A lithium composite oxide having a composition wherein p, x, y, z, q, r and a are within ranges of 0.9≤p≤1.5, 0≤x≤0.8, 0≤y≤1.0, 0≤z≤0.5, 0≤q≤0.1, 1.9≤r≤2.1 and 0≤a≤0.1, respectively, is preferred. Further, it is preferred that p+x+y+z+q=2. Still further, it is preferred that 2r+a=4.

Particularly, p, x, y, z, q, r and a which are independent of one another, are preferably 0.95≤p≤1.2, 0≤x≤0.7, 0.1≤y≤0.5, 0.1≤z≤0.5, 0≤q≤0.08, 1.95≤r≤2.05 and 0≤a≤0.05, respectively, more preferably 0.975≤p≤1.15, 0≤x≤0.65, 0.2≤y≤0.5, 0.2≤z≤0.5, 0≤q≤0.05, 1.97≤r≤2.05 and 0≤a≤0.03, respectively.

Particularly, element M is preferably at least one element selected from the group consisting of Al, Mg, Zr, Ti and Ge, more preferably at least one element selected from the group consisting of Al, Mg and Zr. When element M contains a doped element such as Al, the battery properties such as the charge and discharge cycle properties, safety, etc. will be improved, such being desirable. On the other hand, when element M does not contain a doped element such as Al, the discharge capacity tends to be improved, and therefore, in a case where the discharge capacity is of importance, q=0 is preferred. Further, when the lithium composite oxide contains fluorine, the safety will be improved, and therefore, in a case where the safety is of importance, a composition containing fluorine is preferred. On the other hand, when no fluorine is contained, the discharge capacity tends to be improved, and therefore, in a case where the discharge capacity is of importance, a=0 is preferred.

As a specific composition of the cathode active material for a lithium ion secondary battery of the present invention represented by $Li_pNi_xCo_yMn_zM_qO_rF_a$, a composition represented by $LiCoO_2$, $LiNi_{0.8}Co_{0.2}O_2$, $LiNi_{0.8}Co_{0.16}Al_{0.04}O_2$, $LiNi_{0.33}Co_{0.37}Mn_{0.30}O_2$, $LiNi_{0.8}Co_{0.1}Mn_{0.1}O_2$, $LiNi_{1/3}Co_{1/3}Mn_{1/3}O_2$, $LiNi_{0.5}Co_{0.2}Mn_{0.3}O_2$, $Li_{1.015}(Ni_{0.50}Co_{0.20}Mn_{0.30})_{0.985}O_2$ or $LiNi_{0.6}Co_{0.2}Mn_{0.2}O_2$ may be mentioned. Among them, $LiNi_{0.33}Co_{0.37}Mn_{0.30}O_2$, $LiNi_{1/3}Co_{1/3}Mn_{1/3}O_2$, $LiNi_{0.5}Co_{0.2}Mn_{0.3}O_2$, $Li_{1.015}(Ni_{0.50}Co_{0.20}Mn_{0.30})_{0.985}O_2$ or $LiNi_{0.6}Co_{0.2}Mn_{0.2}O_2$ is preferred.

The specific surface area of the powder of the cathode active material is preferably from 0.2 to 1.5 $m^2/g$, more preferably from 0.2 to 0.5 $m^2/g$. Here, in the present invention, the specific surface area is measured by a BET method.

The alkali content in the powder of the cathode active material is preferably from 0.1 to 1.5 mol %, more preferably from 0.2 to 1.0 mol %. Here, in the present invention, the alkali content is obtained by dispersing 5 g of the powder of the lithium composite oxide in 100 g of pure water, followed by stirring for 30 minutes and then by filtration, and subjecting the obtained filtrate to potentiometric titration with a 0.02 mol % hydrochloric acid aqueous solution, whereby the alkali content is obtained from the hydrochloric acid aqueous solution used until the pH reaches 4.0.

The method for producing the cathode active material for a lithium ion secondary battery of the present invention is not particularly limited, but the cathode active material can be produced particularly preferably by the following method.

For example, it is obtainable by mixing a powder P which is a collection of plural particles having different particle sizes and which is made of large particle size lithium composite oxide, wherein a particle size x of a particle contained in the powder P and its frequency I have a relation of function I(x) represented by the formula 3 (provided that in the formula 3, the median size $\mu_i$ is 10 $\mu m \le \mu_i \le 30$ $\mu m$ and the standard deviation $\sigma_i$ is $1.16 \le \sigma_i \le 1.65$), with respect to a powder P' after the powder P is pressed by 1.92 $t/cm^2$, the function N(x) of a particle size x of a particle contained in the powder P' and its frequency N has a relation of the formula 4 (provided that in the formula 4, in the collection of the large particles, the median size $\mu'_i$ is 10 $\mu m \le \mu'_i \le 30$ $\mu m$ and the standard deviation $\sigma'_i$ is $1.16 \le \sigma'_i \le 1.65$), and the rate of change of the median size $\mu'_i$ relative to $\mu_i$ is at most 10%, and a powder Q which is a collection of plural particles having different particle sizes and which is made of small particle size lithium composite oxide, wherein a particle size x of a particle contained in the powder Q and its frequency J have a relation of function J(x) represented by the formula 5 (provided that in the formula 5, the median size $\mu_j$ is 0.1 $\mu m \le \mu_j < 10$ $\mu m$ and the standard deviation $\sigma'_j$ is $1.16 \le \sigma_j \le 1.65$), with respect to a powder Q' after the powder Q is pressed by 1.92 $t/cm^2$, the function L(x) of a particle size x of a particle contained in the powder Q' and its frequency L has a relation of the formula 6 (provided that in the formula 6, in the collection of the small particles, the median size $\mu'_j$ is 0.1 $\mu m \le \mu'_j < 10$ $\mu m$ and the standard deviation $\sigma'_j$ is $1.16 \le \sigma'_j \le 1.65$), and the rate of change of the median size $\mu'_j$ relative to $\mu_j$ is at least 20%. The mixing ratio of the powder P to the powder Q is preferably from 90:10 to 50:50, more preferably from 80:20 to 70:30, by weight mixing ratio.

The powder P made of large particle size lithium composite oxide wherein the rate of change of the median size $\mu'_i$ relative to $\mu_i$ is at most 10%, and the powder Q made of small particle size lithium composite oxide wherein the rate of change of the median size $\mu'_j$ relative to $\mu_j$ is at least 20%, can be produced by mixing a lithium compound and an intermediate raw material powder comprising at least one compound selected from a nickel compound, a cobalt compound and a manganese compound, and firing the obtainable mixture in an oxygen-containing atmosphere at from 700 to 1,050° C. for from 1 to 16 hours. The above intermediate raw material may, for example, be a hydroxide, an oxyhydroxide, an oxide, etc., and in a case where it contains two or more transition metal elements, a coprecipitated product is preferred, and a coprecipitated hydroxide or a coprecipitated oxyhydroxide is more preferred. Characteristics of a coprecipitated product may be controlled by selecting coprecipitation conditions (such as the ammonium ion concentration, the transition metal ion concentration, the pH of the aqueous solution for coprecipitation, the temperature, the oxygen concentration in the solution or the reducing character of the solution, the time for coprecipitation, the stirring speed of the aqueous solution for coprecipitation, the amount of nuclei, etc.). Further, by controlling coprecipitation conditions in multi-stages, it is possible to control the characteristics of the coprecipitated product (including control of the secondary particle size, the primary particle size, the hardness of the secondary particles, the hollow portions of the secondary particles, etc.). More specifically, by increasing the transition metal ion concentration, inside of particles may be made dense, and under such a condition that the ammonium ion concentration is adjusted to be extremely low, or coprecipitation is carried out while blowing oxygen, hollow particles may be obtained. Further, by shortening the reaction time or by shortening the retention time, nearly hollow particles may be obtained.

Further, as another method, it is obtainable by mixing a large particle size raw material C which comprises at least one compound selected from a nickel compound, a cobalt compound and a manganese compound and which is a collection of many large particles having different particle sizes, wherein the function K(x) of a particle size x of a particle contained in the large particle size raw material C and its frequency K has a relation of the formula 7 (provided that in the formula 7, the median size $\mu_k$ is 10 $\mu m \le \mu_k \le 30$ $\mu m$ and the standard deviation $\sigma_k$ is $1.16 \le \sigma_k \le 1.65$), with respect to a large particle size raw material C' after the large particle size raw material C is pressed by 1.92 $t/cm^2$, the function R(x) of a particle size x of a particle contained in the large particle size raw material C' and its frequency R has a relation of the formula 8 (provided that in the formula 8, the median size $\mu'_k$ is 10 $\mu m \le \mu'_k \le 30$ $\mu m$ and the standard deviation $\sigma'_k$ is $1.16 \le \sigma'_k \le 1.65$), and the rate of change of the median size $\mu'_k$ relative to $\mu_k$ is at most 10%, and a small particle size raw material D which comprises at least one compound selected from a nickel compound, a cobalt compound and a manganese compound and which is a collection of many small particles having different particle sizes, wherein the function M(x) of a particle size x of a particle contained in the small particle size raw material D and its frequency M has a relation of the formula 9 (provided that in the formula 9, the median size $\mu m$ is 0.1 $\mu m \le \mu m < 10$ $\mu m$ and the standard deviation $\sigma_m$ is $1.16 \le \sigma_m \le 1.65$), with respect to a small particle size raw material D' after the small particle size raw material D is pressed by 1.92 t/cm², the function S(x) of a particle size x of a particle contained in the small particle size raw material D' and its frequency S has a relation of the formula 10 (provided that in the formula 10, the median size $\mu'_m$ is 0.1 $\mu m \leq \mu'_m < 10$ $\mu m$ and the standard deviation $\sigma'_m$ is $1.16 \leq \sigma'_m \leq 1.65$), and the rate of change of the median size $\mu'_m$ relative to $\mu_m$ is at least 20%, so that their weight mixing ratio would be within a range of from 90:10 to 50:50, then further mixing a lithium compound thereto to obtain a mixture, and firing the mixture at a temperature of from 700 to 1,050° C. Further, the mixing ratio of the large particle size raw material C to the small particle size raw material D is preferably from 90:10 to 50:50, more preferably from 80:20 to 70:30, by weight mixing ratio.

In a case where a positive electrode is to be produced by using the cathode active material for a lithium ion secondary battery of the present invention, a carbon-type conductive material such as acetylene black, graphite or ketjen black, and a binder, are mixed to the cathode active material. As the binder, it is preferred to use polyvinylidene fluoride, polytetrafluoroethylene, polyamide, carboxymethyl cellulose, an acrylic resin or the like. The cathode active material of the present invention, the conductive material and the binder are formed into a slurry or kneaded product by using a solvent or dispersing medium. Such a slurry or kneaded product is applied to a positive electrode current collector such as an aluminum foil or a stainless steel foil by e.g. coating, to form a positive electrode.

As a separator in a lithium ion secondary battery using the cathode active material for a lithium ion secondary battery of the present invention, a porous polyethylene, a porous polypropylene or the like may be used. Further, as a solvent for an electrolytic solution, various solvents may be used, but among them, a carbonate ester is preferred. The carbonate ester may be cyclic or chained. A cyclic carbonate ester may, for example, be propylene carbonate (PC) or ethylene carbonate (EC). A chained carbonate ester may, for example, be dimethyl carbonate (DMC), diethyl carbonate (DEC), ethyl methyl carbonate (EMC), methyl propyl carbonate or methyl isopropyl carbonate.

In a lithium ion secondary battery using the cathode active material of the present invention, one of the above carbonate esters may be used alone, or two or more of them may be used in combination. Or, another solvent may be mixed thereto. Further, depending upon the material of the anode active material, it may be possible to improve the discharge capacity, the cycle properties or the charge and discharge efficiency by using a chained carbonate ester and a cyclic carbonate ester in combination.

Further, in the lithium ion secondary battery using the lithium composite oxide of the present invention as the cathode active material, a gel polymer electrolyte containing a vinylidene fluoride-hexafluoropropylene copolymer or a vinylidene fluoride-perfluoropropyl vinyl ether copolymer may be employed. As the solute to be added to the electrolytic solvent or the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $(CF_3SO_2)_3C^-$, $CF_3CO_2^-$ or $(CF_3SO_2)_2N^-$ is anion. The lithium salt is preferably added in a concentration of from 0.2 to 2.0 mol/L to the electrolytic solvent or the polymer electrolyte comprising the lithium salt. If the concentration departs from this range, ionic conductivity will decrease, and the electrical conductivity of the electrolyte will decrease. The concentration is particularly preferably from 0.5 to 1.5 mol/L.

In the lithium ion secondary battery using the lithium composite oxide of the present invention as the cathode active material, a material which can occlude and discharge lithium ions may be used for the anode active material. The material forming the anode active material is not particularly limited, however, lithium metal, a lithium alloy, a carbon material, an oxide comprising, as a main component, a metal of Group 14 or Group 15 in the Periodic Table, a carbon compound, a silicon carbide compound, a silicon oxide compound, titanium sulfide, or a boron carbide compound may, for example, be mentioned. As the carbon material, one having an organic material thermally decomposed under various thermal decomposition conditions, artificial graphite, natural graphite, soil graphite, exfoliated graphite or flake graphite may, for example, be used. Further, as the oxide, a compound comprising tin oxide as a main component can be used. As the negative electrode current collector, a copper foil or a nickel foil may, for example, be used. The negative electrode is produced preferably by kneading the anode active material with an organic solvent to form a slurry, which is applied to the metal foil current collector, followed by drying and pressing.

There are no particular restrictions on the shape of the lithium ion secondary battery using the cathode active material of the present invention. The shape is selected from a sheet shape, a film shape, a folded shape, a wound cylinder with bottom, a button shape and so on, depending upon the intended purpose.

EXAMPLES

Now, the present invention will be described in further detail with reference to Examples. However, the present invention is by no means restricted to such specific Examples.

[Ex. 1] Example of the Present Invention

A substantially spherical composite hydroxide powder having a median size of 16 µm and having a composition of $Ni_{0.50}Co_{0.20}Mn_{0.30}(OH)_2$, and a lithium carbonate powder were mixed and then fired in an oxygen-containing atmosphere at 950° C. for 10 hours to obtain a powder of large particle size lithium composite oxide having a composition of $Li_{1.015}(Ni_{0.50}Co_{0.20}Mn_{0.30})_{0.985}O_2$. The particle size distribution of this large particle size lithium composite oxide was measured, whereby the median size was 16.1 µm and the standard deviation was 1.36. At the time when this powder of large particle size lithium composite oxide was pressed by a pressure of 1.92 t/cm², the porosity was 32.9%. It was confirmed that $\mu_i$, $\sigma_i$ and $A_i$ satisfy the formula 3, and $\mu'_i$, $\sigma'_i$ and $A'_i$ satisfy the formula 4. Further, the rate of change in the median size between before and after the pressing of the powder of large particle size lithium-containing composite oxide by a pressure of 1.92 t/cm², was 5.6%.

A hollow composite hydroxide powder having a median size of 5 µm and having a composition of $Ni_{0.50}Co_{0.20}Mn_{0.30}(OH)_2$, and a lithium carbonate powder were mixed and then fired in an oxygen-containing atmosphere at 950° C. for 10 hours to obtain a powder of small particle size lithium composite oxide having a composition of $Li_{0.015}(Ni_{0.50}Co_{0.20}Mn_{0.30})_{0.985}O_2$. The particle size distribution of this small particle size lithium composite oxide was measured, whereby the median size was 6.1 µm and the standard deviation was 1.64. At the time when this powder of small particle size lithium composite oxide was pressed by a pressure of 1.92 t/cm², the porosity was 34.0%. It was confirmed that $\mu_j$, $\sigma_j$ and $A_j$ satisfy the formula 5, and $\mu'_j$, $\sigma'_j$ and $A'_j$ satisfy the formula 6. Further, the rate of change in the median size between before and after the pressing of the powder of small particle size lithium-containing composite oxide by a pressure of 1.92 t/cm², was 72.5%.

The above large particle size lithium composite oxide and small particle size lithium composite oxide were mixed in a ratio of large particle size lithium composite oxide:small particle size lithium composite oxide=80:20 by weight ratio to obtain a powder of a cathode active material. The composition of this cathode active material was $Li_{1.015}(Ni_{0.50}Co_{0.20}Mn_{0.38})_{0.985}O_2$. Further, the powder of the cathode active material had a pressed density of 3.65 g/cm³, a specific surface area of 0.30 m²/g and a free alkali amount of 0.83 mol %.

With respect to the obtained powder of the cathode active material, the particle size distribution was measured, and $\mu_g$, $\sigma_g$, $A_g$, $\mu_h$, $\sigma_h$ and $A_h$ were obtained and found to be 15.4 μm, 1.41, 0.73, 4.8 μm, 1.44 and 0.27, respectively. Further, the powder of the cathode active material was pressed by 1.92 t/cm², and the particle size distribution of the obtained powder was measured, whereupon the median size and the standard deviation were obtained from the obtained particle size distribution. As a result, the rate of change in the median diameter $\mu_g$ was 1.43%, and the rate of change in the median diameter $\mu_h$ was 44.9%. Further, the porosity at the time when this powder was pressed by a pressure of 1.92 t/cm² was 23.0%. Further, it was confirmed that $\mu_g$, $\sigma_g$, $A_g$, $\mu_h$, $\sigma_h$ and $A_h$ satisfy the formula 1, and $\mu'_g$, $\sigma'_g$, $A'_g$, $\mu'_h$, $\sigma'_h$ and $A'_h$ satisfy the formula 2. Further, when this powder was pressed by 1.92 t/cm², the volume cumulative fraction of particles having a particle size of at most 0.75 μm was 0.17%, and the volume cumulative fraction of at most 0.69 μm was 0%.

Then, the obtained cathode active material, acetylene black and polyvinylidene fluoride were mixed in a mass ratio of 80/12/8, and N-methylpyrrolidone was added to prepare a slurry, which was applied onto one side of an aluminum foil having a thickness of 20 μm, by a doctor blade. After drying, roll pressing was carried out to obtain a positive electrode sheet for a lithium battery.

A simplified sealed cell type lithium battery made of stainless steel was assembled in an argon glove box, using one having the above positive electrode sheet punched out as a positive electrode, a metal lithium foil having a thickness of 500 μm as a negative electrode, a stainless steel plate as a negative electrode current collector, a porous polypropylene having a thickness of 250 μm as a separator and a $LiPF_6/EC+DEC$ (1:1) solution (which means a mixed solution of EC and DEC in a volume ratio (1:1) whose solute is $LiPF_6$; the same applies to solvents mentioned hereinafter) in a concentration of 1 M as an electrolytic solution. The assembled battery was charged up to 4.3 V with a load current of 180 mA per 1 g of the cathode active material at 40° C. and then, a constant voltage charging was carried out at that voltage for 3 hours. Then, after a downtime for 30 minutes, discharging was carried out down to 2.75 V at a load current of 37.5 mA per 1 g of the cathode active material, whereby the discharge capacity was measured. From the mass per unit volume of the electrode and the discharge capacity, the volume capacity density was obtained and found to be 620 mAh/cm³.

[Ex. 2] Comparative Example

A solid composite hydroxide powder having a median size of 5 μm and having a composition of $Ni_{0.50}Co_{0.20}Mn_{0.30}$(OH)₂, and a lithium carbonate powder were mixed and then fired in an oxygen-containing atmosphere at 950° C. for 10 hours to obtain a powder of small particle size lithium composite oxide having a composition of $Li_{1.015}(Ni_{0.50}Co_{0.20}Mn_{0.30})_{0.985}O_2$. The particle size distribution of this small particle size lithium composite oxide was measured, whereby the median size $\mu_j$ in the formula 5 was 6.5 μm and the standard deviation $\sigma_j$ a was 1.57. This small particle size lithium composite oxide was pressed by 1.92 t/cm², and the particle size distribution of the obtained powder was measured and the median size was obtained, whereby the median size $\mu'_j$ in the formula 6 was 5.6 μm, and the rate of change in the median size $\mu_j$ was 13.8%. The large particle size lithium composite oxide obtained in Ex. 1 and this small particle size lithium composite oxide were mixed in a ratio of large particle size lithium composite oxide:small particle size lithium composite oxide=80:20 by weight ratio to obtain a powder of a cathode active material. The composition of this cathode active material was $Li_{1.015}(Ni_{0.50}Co_{0.20}Mn_{0.30})_{0.985}O_2$. With respect to the obtained powder of the cathode active material, the particle size distribution was measured in the same manner as in Ex. 1, whereby $\mu_g$, $\sigma_g$, $A_g$, $\mu_h$, $\sigma_h$ and $A_h$ were 15.4 μm, 1.41, 0.73, 4.8 μm, 1.44 and 0.27, respectively. Further, the powder of the cathode active material was pressed by 1.92 t/cm², and the particle size distribution of the obtained powder was measured, whereupon the median size and the standard deviation were obtained from the obtained particle size distribution. As a result, the rate of change in the median diameter $\mu_g$ was 2.61%, and the rate of change in the median diameter $\mu_h$ was 16.5%. Further, the porosity of this powder was 29.7%. Further, this powder had a pressed density of 3.33 g/cm³, a specific surface area of 0.28 m²/g and a free alkali amount of 0.80 mol %. Further, in the same manner as in Ex. 1, the battery evaluation was carried out, whereby the volume capacity density was 560 mAh/cm³.

[Ex. 3] Example of the Present Invention

A powder of a cathode active material was obtained in the same manner as in Ex. 1 except that the large particle size lithium composite oxide and small particle size lithium composite oxide were mixed in a ratio of large particle size lithium composite oxide:small particle size lithium composite oxide=70:30 by weight ratio. With respect to the obtained powder of the cathode active material, the powder properties were measured in the same manner as in Ex. 1, whereby $\mu_g$, $\sigma_g$, $A_g$, $\mu_h$, $\sigma_h$ and $A_h$ were 15.0 μm, 1.45, 0.64, 4.6 μm, 1.38 and 0.36, respectively. Further, the powder of the cathode active material was pressed by 1.92 t/cm², and the particle size distribution of the obtained powder was measured, whereupon the median size and the standard deviation were obtained from the obtained particle size distribution. As a result, the rate of change in the median diameter $\mu_g$ was 3.45%, and the rate of change in the median diameter $\mu_h$ was 58.2%. Further, the porosity of this powder was 22.6%. Further, it was confirmed that $\mu_g$, $\sigma_g$, $A_g$, $\mu_h$, $\sigma_h$ and $A_h$ satisfy the formula 1, and $\mu'_g$, $\sigma'_g$, $A'_g$, $\mu'_h$, $\sigma'_h$ and $A'_h$ satisfy the formula 2. Further, when this powder was pressed by a pressure of 1.92 t/cm², the volume cumulative fraction of particles having a particle size of at most 0.75 μm was 0.96%, and the volume cumulative fraction of at most 0.69 μm was 0.44%. Further, this powder had a pressed density of 3.67 g/cm³, a specific surface area of 0.35 m²/g and a free alkali amount of 0.88 mol %. Further, in the same manner as in Ex. 1, the battery evaluation was carried out, whereby the volume capacity density was 624 mAh/cm³.

[Ex. 4] Comparative Example

A powder of a cathode active material was obtained in the same manner as in Ex. 2 except that the large particle size lithium composite oxide and small particle size lithium composite oxide were mixed in a ratio of large particle size lithium composite oxide:small particle size lithium composite oxide=70:30 by weight ratio. With respect to the obtained powder of the cathode active material, the powder properties were measured in the same manner as in Ex. 1, whereby $\mu_g$, $\sigma_g$, $A_g$, $\mu_h$, $\sigma_h$ and $A_h$ were 15.0 µm, 1.46, 0.64, 4.6 µm, 1.38 and 0.36, respectively. Further, the powder of the cathode active material was pressed by 1.92 t/cm², and the particle size distribution of the obtained powder was measured, whereupon the median size and the standard deviation were obtained from the obtained particle size distribution. As a result, the rate of change in the median diameter $\mu_g$ was 2.13%, and the rate of change in the median diameter $\mu_h$ was 13.7%. Further, the porosity of this powder was 29.1%. Further, the powder of the cathode active material had a pressed density of 3.65 g/cm³, a specific surface area of 0.33 m²/g and a free alkali amount of 0.85 mol %. Further, in the same manner as in Ex. 1, the battery evaluation was carried out, whereby the volume capacity density was 555 mAh/cm³.

[Ex. 5] Example of the Present Invention

A powder of a cathode active material was obtained in the same manner as in Ex. 1 except that the large particle size lithium composite oxide and small particle size lithium composite oxide were mixed in a ratio of large particle size lithium composite oxide:small particle size lithium composite oxide=60:40 by weight ratio. With respect to the obtained powder of the cathode active material, the powder properties were measured in the same manner as in Ex. 1, whereby $\mu_g$, $\sigma_g$, $A_g$, $\mu_h$, $\sigma_h$ and $A_h$ were 14.3 µm, 1.51, 0.56, 4.5 µm, 1.34 and 0.44, respectively. Further, the powder of the cathode active material was pressed by 1.92 t/cm², and the particle size distribution of the obtained powder was measured, whereupon the median size and the standard deviation were obtained from the obtained particle size distribution. As a result, the rate of change in the median diameter $\mu_g$ was 4.25%, and the rate of change in the median diameter $\mu_h$ was 61.2%. Further, the porosity of this powder was 23.2%. Further, it was confirmed that $\mu_g$, $\sigma_g$, $A_g$, $\mu_h$, $\sigma_n$ and $A_h$ satisfy the formula 1, and $\mu'_g$, $\sigma'_g$, $A'_g$, $\mu'_h$, $\sigma'_h$ and $A'_h$ satisfy the formula 2. Further, when this powder was pressed by a pressure of 1.92 t/cm², the volume cumulative fraction of particles having a particle size of at most 0.75 µm was 1.15%, and the volume cumulative fraction of at most 0.69 µm was 0.50%. Further, the powder of the cathode active material had a pressed density of 3.64 g/cm³, a specific surface area of 0.40 m²/g and a free alkali amount of 0.95 mol %. Further, in the same manner as in Ex. 1, the battery evaluation was carried out, whereby the volume capacity density was 615 mAh/cm³.

[Ex. 6] Comparative Example

A powder of a cathode active material was obtained in the same manner as in Ex. 2 except that the large particle size lithium composite oxide and small particle size lithium composite oxide were mixed in a ratio of large particle size lithium composite oxide:small particle size lithium composite oxide=60:40 by weight ratio. With respect to the obtained powder of the cathode active material, the powder properties were measured in the same manner as in Ex. 1, whereby $\mu_g$, $\sigma_g$, $A_g$, $\mu_h$, $\sigma_h$ and $A_h$ were 14.4 µm, 1.50, 0.56, 4.5 µm, 1.35 and 0.44, respectively. Further, the powder of the cathode active material was pressed by 1.92 t/cm², and the particle size distribution of the obtained powder was measured, whereupon the median size and the standard deviation were obtained from the obtained particle size distribution. As a result, the rate of change in the median diameter $\mu_g$ was 6.70%, and the rate of change in the median diameter $\mu_h$ was 7.6%. Further, the porosity of this powder was 29.5%. Further, the powder of the cathode active material had a pressed density of 3.34 g/cm³, a specific surface area of 0.38 m²/g and a free alkali amount of 0.93 mol %. Further, in the same manner as in Ex. 1, the battery evaluation was carried out, whereby the volume capacity density was 558 mAh/cm³.

The results obtained in Ex. 1 to 6 are summarized in Tables 1 to 3. The median size and the standard deviation, before and after the pressing by 1.92 t/cm², of each of the large particle size lithium composite oxide and the small particle size lithium composite oxide used in Ex. 1 and 2, are summarized in Table 3. Further, the particle size distribution of the cathode active material obtained in Ex. 1 is shown in Table 4, and the results of measurement of the particle size distribution of a powder after the powder of the cathode active material obtained in Ex. 1 was pressed by 1.92 t/cm², are shown in Table 5.

Figure 1:
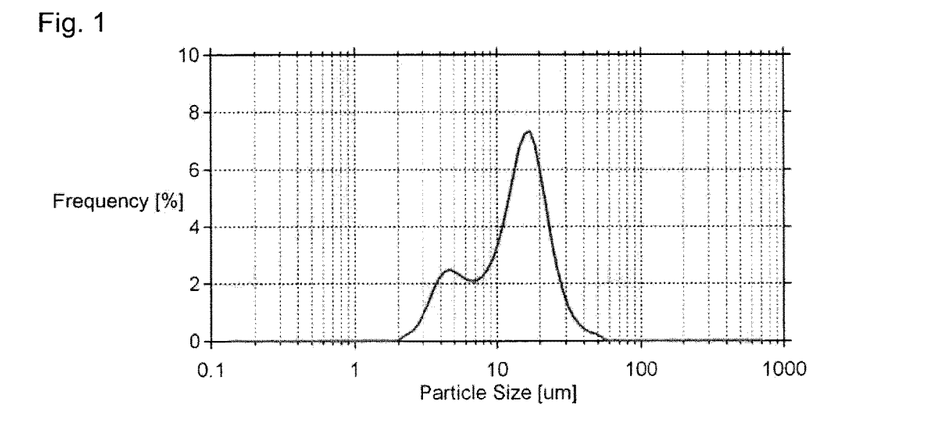
FIG. 1 shows the particle size distribution of a powder of the cathode active material obtained in Ex. 1.
Figure 2:
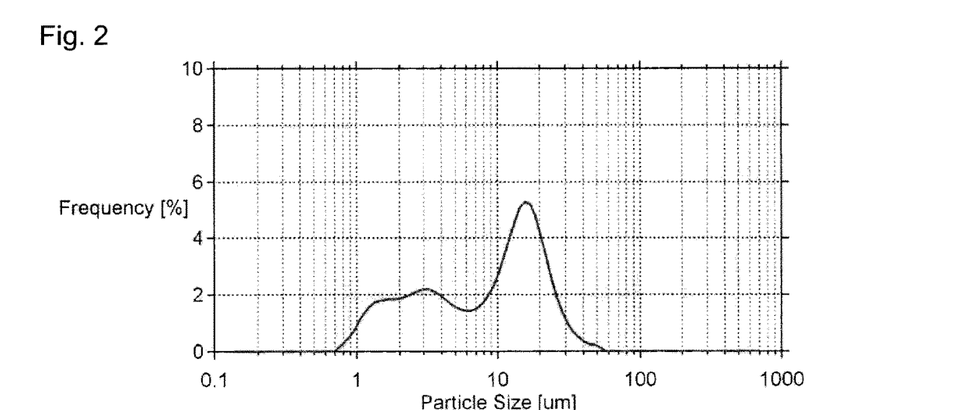
FIG. 2 shows the particle size distribution of a powder after the cathode active material obtained in Ex. 1 was pressed by 1.92 t/cm².

Further, FIG. 1 shows the particle size distribution of the powder of the cathode active material obtained in Ex. 1, and FIG. 2 shows the particle size distribution of the powder after the cathode active material obtained in Ex. 1 was pressed by 1.92 t/cm². When FIGS. 1 and 2 showing the particle size distributions before and after the pressing, are compared to each other, it is evident that after the pressing, the small particle size component is selectively disintegrated from agglomeration to form a finer powder.

TABLE 1

| | $\mu_g$ (µm) | $\sigma_g$ | $A_g$ | $\mu_h$ (µm) | $\sigma_h$ | $A_h$ | $\mu'_g$ (µm) | $\sigma'_g$ | $A'_g$ | $\mu'_h$ (µm) | $\sigma'_h$ | $A'_h$ |
|---|---|---|---|---|---|---|---|---|---|---|---|---|
| Ex. 1 | 15.4 | 1.4 | 0.7 | 4.8 | 1.4 | 0.3 | 15.2 | 1.4 | 0.5 | 2.7 | 2.1 | 0.5 |
| Ex. 2 | 15.4 | 1.4 | 0.7 | 4.8 | 1.4 | 0.3 | 15.8 | 1.4 | 0.6 | 4.0 | 1.6 | 0.4 |
| Ex. 3 | 14.9 | 1.5 | 0.6 | 4.6 | 1.4 | 0.4 | 14.4 | 1.5 | 0.5 | 1.9 | 2.1 | 0.5 |
| Ex. 4 | 15.0 | 1.5 | 0.6 | 4.6 | 1.4 | 0.4 | 15.3 | 1.5 | 0.5 | 3.9 | 1.6 | 0.5 |
| Ex. 5 | 14.3 | 1.5 | 0.6 | 4.5 | 1.3 | 0.4 | 13.7 | 1.4 | 0.4 | 1.8 | 1.9 | 0.6 |
| Ex. 6 | 14.4 | 1.5 | 0.6 | 4.5 | 1.3 | 0.4 | 15.3 | 1.5 | 0.5 | 4.2 | 1.7 | 0.5 |

TABLE 2

| | Rate of change in $\mu_g$ (%) | Rate of change in $\mu_h$ (%) | Porosity (%) | Pressed density (g/cm³) | Volume capacity density (mAh/cm³) |
|---|---|---|---|---|---|
| Ex. 1 | 1.4 | 44.9 | 23.0 | 3.65 | 620 |
| Ex. 2 | 2.6 | 16.4 | 29.7 | 3.33 | 560 |
| Ex. 3 | 3.5 | 58.1 | 22.6 | 3.67 | 624 |
| Ex. 4 | 2.1 | 13.7 | 29.1 | 3.36 | 555 |
| Ex. 5 | 4.3 | 61.2 | 23.2 | 3.64 | 615 |
| Ex. 6 | 6.7 | 7.6 | 29.5 | 3.34 | 558 |

TABLE 3

| | $\mu_i$ (μm) | $\sigma_i$ | $\mu_j$ (μm) | $\sigma_j$ | $\mu'_i$ (μm) | $\sigma'_i$ | $\mu'_j$ (μm) | $\sigma'_j$ |
|---|---|---|---|---|---|---|---|---|
| Ex. 1 | 16.1 | 1.4 | 6.1 | 1.6 | 15.2 | 1.5 | 1.7 | 1.6 |
| Ex. 2 | 16.1 | 1.4 | 6.5 | 1.6 | 15.2 | 1.5 | 5.6 | 1.6 |

TABLE 4

| Particle size (μm) | Frequency (%) |
|---|---|
| 704.0 | 0 |
| 645.6 | 0 |
| 592.0 | 0 |
| 542.9 | 0 |
| 497.8 | 0 |
| 456.5 | 0 |
| 418.6 | 0 |
| 383.9 | 0 |
| 352.0 | 0 |
| 322.8 | 0 |
| 296.0 | 0 |
| 271.4 | 0 |
| 248.9 | 0 |
| 228.2 | 0 |
| 209.3 | 0 |
| 191.9 | 0 |
| 176.0 | 0 |
| 161.4 | 0 |
| 148.0 | 0 |
| 135.7 | 0 |
| 124.5 | 0 |
| 114.1 | 0 |
| 104.7 | 0 |
| 95.97 | 0 |
| 88.00 | 0 |
| 80.70 | 0 |
| 74.00 | 0 |
| 67.86 | 0 |
| 62.23 | 0 |
| 57.06 | 0 |
| 52.33 | 0.15 |
| 47.98 | 0.25 |
| 44.00 | 0.30 |
| 40.35 | 0.41 |
| 37.00 | 0.57 |
| 33.93 | 0.83 |
| 31.11 | 1.20 |
| 28.53 | 1.77 |
| 26.16 | 2.56 |
| 23.99 | 3.56 |
| 22.00 | 4.77 |
| 20.17 | 5.87 |
| 18.50 | 6.86 |
| 16.96 | 7.33 |
| 15.56 | 7.24 |
| 14.27 | 6.76 |
| 13.08 | 5.88 |
| 12.00 | 5.00 |
| 11.00 | 4.12 |
| 10.09 | 3.41 |
| 9.250 | 2.86 |
| 8.482 | 2.48 |
| 7.778 | 2.24 |
| 7.133 | 2.11 |
| 6.541 | 2.10 |
| 5.998 | 2.16 |
| 5.500 | 2.29 |
| 5.044 | 2.41 |
| 4.625 | 2.49 |
| 4.241 | 2.42 |
| 3.889 | 2.18 |
| 3.556 | 1.81 |
| 3.270 | 1.33 |
| 2.999 | 0.93 |
| 2.750 | 0.59 |
| 2.522 | 0.37 |

TABLE 4-continued

| Particle size (μm) | Frequency (%) |
|---|---|
| 2.313 | 0.25 |
| 2.121 | 0.14 |
| 1.945 | 0 |
| 1.783 | 0 |
| 1.635 | 0 |
| 1.499 | 0 |
| 1.375 | 0 |
| 1.261 | 0 |
| 1.156 | 0 |
| 1.060 | 0 |
| 0.972 | 0 |
| 0.892 | 0 |
| 0.818 | 0 |
| 0.750 | 0 |
| 0.688 | 0 |
| 0.630 | 0 |
| 0.578 | 0 |
| 0.530 | 0 |
| 0.486 | 0 |
| 0.446 | 0 |
| 0.409 | 0 |
| 0.375 | 0 |
| 0.344 | 0 |
| 0.315 | 0 |
| 0.289 | 0 |
| 0.265 | 0 |
| 0.243 | 0 |
| 0.223 | 0 |
| 0.204 | 0 |
| 0.187 | 0 |
| 0.172 | 0 |
| 0.158 | 0 |
| 0.145 | 0 |
| 0.133 | 0 |

TABLE 5

| Particle size (μm) | Frequency (%) |
|---|---|
| 704.0 | 0 |
| 645.6 | 0 |
| 592.0 | 0 |
| 542.9 | 0 |
| 497.8 | 0 |
| 456.5 | 0 |
| 418.6 | 0 |
| 383.9 | 0 |
| 352.0 | 0 |
| 322.8 | 0 |
| 296.0 | 0 |
| 271.4 | 0 |
| 248.9 | 0 |
| 228.2 | 0 |
| 209.3 | 0 |
| 191.9 | 0 |
| 176.0 | 0 |
| 161.4 | 0 |
| 148.0 | 0 |
| 135.7 | 0 |
| 124.5 | 0 |
| 114.1 | 0 |
| 104.7 | 0 |
| 95.97 | 0 |
| 88.00 | 0 |
| 80.70 | 0 |
| 74.00 | 0 |
| 67.86 | 0 |
| 62.23 | 0 |
| 57.06 | 0 |
| 52.33 | 0.13 |
| 47.98 | 0.22 |
| 44.00 | 0.26 |
| 40.35 | 0.35 |

TABLE 5-continued

| Particle size (μm) | Frequency (%) |
|---|---|
| 37.00 | 0.49 |
| 33.93 | 0.68 |
| 31.11 | 0.97 |
| 28.53 | 1.37 |
| 26.16 | 1.92 |
| 23.99 | 2.59 |
| 22.00 | 3.38 |
| 20.17 | 4.12 |
| 18.50 | 4.82 |
| 16.96 | 5.22 |
| 15.56 | 5.29 |
| 14.27 | 5.06 |
| 13.08 | 4.53 |
| 12.00 | 3.94 |
| 11.00 | 3.30 |
| 10.09 | 2.74 |
| 9.250 | 2.29 |
| 8.482 | 1.93 |
| 7.778 | 1.69 |
| 7.133 | 1.53 |
| 6.541 | 1.44 |
| 5.998 | 1.43 |
| 5.500 | 1.47 |
| 5.044 | 1.55 |
| 4.625 | 1.68 |
| 4.241 | 1.83 |
| 3.889 | 1.99 |
| 3.556 | 2.10 |
| 3.270 | 2.18 |
| 2.999 | 2.20 |
| 2.750 | 2.15 |
| 2.522 | 2.08 |
| 2.313 | 1.98 |
| 2.121 | 1.91 |
| 1.945 | 1.86 |
| 1.783 | 1.83 |
| 1.635 | 1.83 |
| 1.499 | 1.81 |
| 1.375 | 1.77 |
| 1.261 | 1.64 |
| 1.156 | 1.42 |
| 1.060 | 1.15 |
| 0.972 | 0.82 |
| 0.892 | 0.55 |
| 0.818 | 0.34 |
| 0.750 | 0.17 |
| 0.688 | 0 |
| 0.630 | 0 |
| 0.578 | 0 |
| 0.530 | 0 |
| 0.486 | 0 |
| 0.446 | 0 |
| 0.409 | 0 |
| 0.375 | 0 |
| 0.344 | 0 |
| 0.315 | 0 |
| 0.289 | 0 |
| 0.265 | 0 |
| 0.243 | 0 |
| 0.223 | 0 |
| 0.204 | 0 |
| 0.187 | 0 |
| 0.172 | 0 |
| 0.158 | 0 |
| 0.145 | 0 |
| 0.133 | 0 |

[Ex. 7] Example of the Present Invention

A substantially spherical composite hydroxide powder having a median size of 12 μm and having a composition of $Ni_{0.33}Co_{0.37}Mn_{0.30}(OH)_2$, and a lithium carbonate powder were mixed and then fired in an oxygen-containing atmosphere at 950° C. for 10 hours to obtain a powder of large particle size lithium composite oxide having a composition of $Li_{1.015}(Ni_{0.33}Co_{0.37}Mn_{0.30})_{0.985}O_2$. The particle size distribution of this large particle size lithium composite oxide was measured, whereby the median size was 12.3 μm and the standard deviation was 1.38. At the time when this powder of large particle size lithium composite oxide was pressed by a pressure of 1.92 t/cm$^2$, the porosity was 33.0%. It was confirmed that $\mu_i$, $\sigma_i$ and $A_i$ satisfy the formula 3, and $\mu'_i$, $\sigma'_i$ and $A'_i$ satisfy the formula 4. Further, the rate of change in the median size between before and after the pressing of this powder of large particle size lithium-containing composite oxide by a pressure of 1.92 t/cm$^2$, was 4.0%.

A hollow composite hydroxide powder having a median size of 5 μm and having a composition of $Ni_{0.33}Co_{0.37}Mn_{0.30}(OH)_2$, and a lithium carbonate powder were mixed and then fired in an oxygen-containing atmosphere at 950° C. for 10 hours to obtain a powder of small particle size lithium composite oxide having a composition of $Li_{0.015}(Ni_{0.33}Co_{0.37}Mn_{0.30})_{0.985}O_2$. The particle size distribution of this small particle size lithium composite oxide was measured, whereby the median size was 5.1 μm and the standard deviation was 1.40. At the time when this powder of small particle size lithium composite oxide was pressed by a pressure of 1.92 t/cm$^2$, the porosity was 34.7%. It was confirmed that $\mu_j$, $\sigma_j$ and $A_j$ satisfy the formula 5, and $\mu'_j$, $\sigma'_j$ and $A'_j$ satisfy the formula 6. Further, the rate of change in the median size between before and after the pressing of this powder of small particle size lithium-containing composite oxide by a pressure of 1.92 t/cm$^2$, was 60.5%.

The above large particle size lithium composite oxide and small particle size lithium composite oxide were mixed in a ratio of large particle size lithium composite oxide:small particle size lithium composite oxide=80:20 by weight ratio to obtain a powder of a cathode active material. The composition of this cathode active material was $Li_{1.015}(Ni_{0.33}Co_{0.37}Mn_{0.30})_{0.985}O_2$. Further, the powder of the cathode active material had a pressed density of 3.51 g/cm$^3$, a specific surface area of 0.30 m$^2$/g and a free alkali amount of 0.31 mol %. Further, in the same manner as in Ex. 1, the battery evaluation was carried out, whereby the volume capacity density was 562 mAh/cm$^3$.

With respect to the obtained powder of the cathode active material, the particle size distribution was measured, and $\mu_g$, $\sigma_g$, $A_g$, $\mu_h$, $\sigma_h$ and $A_h$ were obtained and found to be 12.2 μm, 1.40, 0.73, 4.8 μm, 1.40 and 0.27, respectively. Further, the powder of the cathode active material was pressed by 1.92 t/cm$^2$, and the particle size distribution of the obtained powder was measured, whereupon the median size and the standard deviation were obtained from the obtained particle size distribution. As a result, the rate of change in the median diameter $\mu_g$ was 1.65%, and the rate of change in the median diameter $\mu_h$ was 42.6%. Further, the porosity at the time when this powder was pressed by a pressure of 1.92 t/cm$^2$ was 23.5%. Further, it was confirmed that $\mu_g$, $\sigma_g$, $A_g$, $\mu_h$, $\sigma_h$ and $A_h$ satisfy the formula 1, and $\mu'_g$, $\sigma'_g$, $A'_g$, $\mu'_h$, $\sigma'_h$ and $A'_h$ satisfy the formula 2. Further, when this powder was pressed by a pressure of 1.92 t/cm$^2$, the volume cumulative fraction of particles having a particle size of at most 0.75 μm was 0.15%, and the volume cumulative fraction of at most 0.69 μm was 0%.

[Ex. 8] Comparative Example

A solid composite hydroxide powder having a median size of 5 μm and having a composition of $Ni_{0.33}Co_{0.37}Mn_{0.30}(OH)_2$, and a lithium carbonate powder were mixed and then fired in an oxygen-containing atmosphere at 950° C. for 10 hours to obtain a powder of small particle size lithium composite oxide having a composition of $Li_{1.015}(Ni_{0.33}Co_{0.37}Mn_{0.30})_{0.985}O_2$. The particle size distribution of this small particle size lithium composite oxide was measured, whereby the median size $\mu_j$ in the formula 5 was 5.5 µm and the standard deviation $\sigma_j$ a was 1.55. This small particle size lithium composite oxide was pressed by 1.92 t/cm², and the particle size distribution of the obtained powder was measured and the median size was obtained, whereby the median size $\mu'_j$ in the formula 6 was 5.1 µm, and the rate of change in the median size $\mu_j$ was 7.3%. The large particle size lithium composite oxide obtained in Ex. 1 and this small particle size lithium composite oxide were mixed in a ratio of large particle size lithium composite oxide:small particle size lithium composite oxide=80:20 by weight ratio to obtain a powder of a cathode active material. The composition of this cathode active material was $Li_{1.015}(Ni_{0.33}Co_{0.37}Mn_{0.30})_{0.985}O_2$.

With respect to the obtained powder of the cathode active material, the powder properties were measured in the same manner as in Ex. 1, whereby $\mu_g$, $\sigma_g$, $A_g$, $\mu_h$, $\sigma_h$ and $A_h$ were 12.2 µm, 1.41, 0.73, 4.8 µm, 1.52 and 0.27, respectively. Further, the powder of the cathode active material was pressed by 1.92 t/cm², and the particle size distribution of the obtained powder was measured, whereupon the median size and the standard deviation were obtained from the obtained particle size distribution. As a result, the rate of change in the median diameter $\mu_g$ was 1.61%, and the rate of change in the median diameter µh was 10.1%. Further, the porosity of this powder was 31.0%. Further, this powder had a pressed density of 3.14 g/cm³, a specific surface area of 0.28 m²/g and a free alkali amount of 0.30 mol %. Further, in the same manner as in Ex. 1, the battery evaluation was carried out, whereby the volume capacity density was 502 mAh/cm³.

INDUSTRIAL APPLICABILITY

The present invention provides a cathode active material for a lithium ion secondary battery, having high packing properties and high volume capacity density, and a method for its production.

This application is a continuation of PCT Application No. PCT/JP2013/066744, filed on Jun. 18, 2013, which is based upon and claims the benefit of priority from Japanese Patent Application No. 2012-140230 filed on Jun. 21, 2012. The contents of those applications are incorporated herein by reference in their entireties.

What is claimed is:

1. A cathode active material for a lithium ion secondary battery, comprising:
a mixture B of a collection of many large particles having different particle sizes and a collection of many small particles having different particle sizes,
wherein
a particle size distribution function F(x) of a particle size x of a particle contained in the mixture B and having a particle size frequency F has a relation of the formula 1 (provided that in the formula 1, in the collection of the large particles, a median size $\mu_g$ is 10 µm≤$\mu_g$≤30 µm and standard deviation $\sigma_g$ is 1.16≤$\sigma_g$≤1.65, in the collection of the small particles, a median size $\mu_h$ is 0.1 µm≤$\mu_h$≤10 µm and standard deviation $\sigma_h$ is 1.16≤$\sigma_h$≤1.65, $A_g+A_h=1$, 0<$A_g$<1, 0<$A_h$<1, and 1≤$A_g/A_h$≤9),
a particle size distribution function E(x) of a particle size x of a particle contained in a mixture B' after the mixture B is pressed by 1.92 t/cm² and having a particle size frequency E has a relation of the formula 2 (provided that in the formula 2, in the collection of the large particles, a median size p' is 10 µm≤p'<30 µm and a standard deviation $\sigma'_g$ is 1.16≤$\sigma'_g$≤1.65, in the collection of the small particles, a median size $\mu'_h$ is 0.1 µm≤$\mu'_h$≤10 µm and a standard deviation $\sigma'_h$ is 1.16≤$\sigma'_h$≤2.1, $A'_g+A'_h=1$, 0<$A'_g$<1, 0<$A'_h$<1, and 1≤$A'_g/A'_h$≤9), and
a rate of change of the median size $\mu'_g$ relative to $\mu_g$ is at most 10%, and a rate of change of the median size $\mu'_h$ relative to $\mu_h$ is at least 20%, $$F(x) = A_g \times \frac{1}{\sqrt{2\pi}\,\sigma_g x} \exp\left\{-\frac{(\log x - \mu_g)^2}{2\sigma_g^2}\right\} + A_h \times \frac{1}{\sqrt{2\pi}\,\sigma_h x} \exp\left\{-\frac{(\log x - \mu_h)^2}{2\sigma_h^2}\right\} \quad \text{Formula 1}$$

$$E(x) = A'_g \times \frac{1}{\sqrt{2\pi}\,\sigma'_g x} \exp\left\{-\frac{(\log x - \mu'_g)^2}{2\sigma_g'^2}\right\} + A'_h \times \frac{1}{\sqrt{2\pi}\,\sigma'_h x} \exp\left\{-\frac{(\log x - \mu'_h)^2}{2\sigma_h'^2}\right\} \quad \text{Formula 2}$$

wherein $A_g$ and $A'_g$ are mixing ratios of the large particles before and after pressing at 1.92 t/cm², respectively, and $A_h$ and $A'_h$ are mixing ratios of the small particles before and after pressing at 1.92 t/cm², respectively; and
wherein the cathode active material is a lithium composite oxide having a composition represented by $Li_p Ni_x Co_y Mn_z M_q O_r F_a$,
where
M is at least one element selected from the group consisting of Al, Group 2 elements and transition metal elements other than Ni, Co and Mn, and
p, x, y, z, a, r and a satisfy 0.9<p<1.5, 0<x<0.8, 0.1<y<0.5, 0<z<0.5, 0<q<0.1, 1.9<r<2.1 and 0<a<0.1, respectively.

2. The cathode active material for a lithium ion secondary battery according to claim 1, wherein a porosity when the cathode active material is pressed by 1.92 t/cm² is from 15 to 25%.

3. The cathode active material for a lithium ion secondary battery according to claim 1, wherein the cathode active material has a specific surface area of from 0.2 to 1.5 m²/g.

4. The cathode active material for a lithium ion secondary battery according to claim 1, wherein the cathode active material has an alkali content of from 0.1 to 1.5 mol %.

5. The cathode active material for a lithium ion secondary battery according to claim 1, wherein when the cathode active material is pressed by 1.92 t/cm², the volume cumulative fraction of particles having particle sizes of at most 0.75 µm is at most 1.5%.

6. The cathode active material for a lithium ion secondary battery according to claim 1, wherein the rate of change of the median size $\mu'_g$ relative to $\mu_g$ is from 0.5 to 5%, and the rate of change of the median size $\mu'_h$ relative to $\mu_h$ is from 20 to 80%.

7. The cathode active material of claim 1, wherein $\mu_g$ is from 14.3 to 15.4 m, $\mu_h$ is from 4.5 to 4.8 m, $\mu'_g$ is from 13.7 to 15.2 m and $\mu'_h$ is from 1.8 to 2.7 m.

8. The cathode active material of claim 1, wherein the rate of change in $\mu_g$ is from 1.4 to 4.3% and the rate of change of $\mu_h$ is from 44.9 to 61.2%.

9. The cathode active material of claim 1, having a porosity of 23.2 to 22.6%.

10. The active cathode material of claim 1, having a volume capacity density of from 615 to 624 mA$_h$/cm$^3$.

11. A method for producing the cathode active material for a lithium ion secondary battery as defined in claim 1, which comprises mixing
- a powder P which is a collection of plural particles having different particle sizes and which is made of large particle size lithium composite oxide, wherein a particle size distribution function I(x) of a particle size x of a particle contained in the powder P and having a particle size frequency I has a relation of the formula 3 (provided that in the formula 3, the median size $\mu_i$ is 10 µm≤$\mu_i$≤30 µm and the standard deviation $\sigma_i$ is 1.16<o≤$\sigma_i$≤1.65), with respect to a powder P' after the powder P is pressed by 1.92 t/cm$^2$, a particle size distribution function N(x) of a particle size x of a particle contained in the powder P' and having a particle size frequency N has a relation of the formula 4 (provided that in the formula 4, in the collection of the large particles, the median size $\mu'_i$ is 10 µm≤$\mu'_i$≤30 µm and the standard deviation $\sigma'_i$ is 1.16≤$\sigma'_i$≤1.65), and the rate of change of the median size $\mu'_i$ relative to $\mu_i$ is at most 10%, and
- a powder Q which is a collection of plural particles having different particle sizes and which is made of small particle size lithium composite oxide, wherein a particle size distribution function J(x) of a particle size x of a particle contained in the powder Q and having a particle size frequency J has a relation of the formula 5 (provided that in the formula 5, the median size $\mu_j$ is 0.1 µm≤$\mu_j$≤10 µm and the standard deviation $\sigma_j$ is 1.16≤$\sigma_j$≤1.65), with respect to a powder Q' after the powder Q is pressed by 1.92 t/cm$^2$, a particle size distribution function L(x) of a particle size x of a particle contained in the powder Q' and having a particle size frequency L has a relation of the formula 6 (provided that in the formula 6, in the collection of the small particles, the median size $\mu'_j$ is 0.1 µm≤$\mu'_j$≤10 µm and the standard deviation $\sigma'_j$ is 1.16≤$\sigma'_j$≤1.65), and the rate of change of the median size $\mu'_j$ relative to $\mu_j$ is at least 20%, so that their weight mixing ratio would be within a range of from 90:10 to 50:50, $$I(x) = \frac{1}{\sqrt{2\pi}\,\sigma_i x}\exp\left\{-\frac{(\log x - \mu_i)^2}{2\sigma_i^2}\right\} \quad \text{Formula 3}$$

$$N(x) = \frac{1}{\sqrt{2\pi}\,\sigma'_i x}\exp\left\{-\frac{(\log x - \mu'_i)^2}{2\sigma'^2_i}\right\} \quad \text{Formula 4}$$

$$J(x) = \frac{1}{\sqrt{2\pi}\,\sigma_j x}\exp\left\{-\frac{(\log x - \mu_j)^2}{2\sigma_j^2}\right\} \quad \text{Formula 5}$$

$$L(x) = \frac{1}{\sqrt{2\pi}\,\sigma'_j x}\exp\left\{-\frac{(\log x - \mu'_j)^2}{2\sigma'^2_j}\right\}. \quad \text{Formula 6}$$

12. A method for producing the cathode active material for a lithium ion secondary battery as defined in claim 1, which comprises mixing
- a large particle size raw material C which comprises at least one compound selected from a nickel compound, a cobalt compound and a manganese compound and which is a collection of many large particles having different particle sizes, wherein a particle size distribution function K(x) of a particle size x of a particle contained in the large particle size raw material C and having a particle size frequency K has a relation of the formula 7 (provided that in the formula 7, the median size $\mu_k$ is 10 µm≤$\mu_k$≤30 µm and the standard deviation $\sigma_k$ is 1.16≤$\sigma_k$≤1.65), a particle size distribution function R(x) of a particle size x of a large particle size raw material C' after the large particle size raw material C is pressed by 1.92 t/cm$^2$ and having a particle size frequency R has a relation of the formula 8 (provided that in the formula 8, the median size $\mu'_k$ is 10 µm≤$\mu'_k$≤30 µm and the standard deviation $\sigma'_k$ is 1.16≤$\sigma'_k$≤1.65), and the rate of change of the median size $\mu'_k$ relative to $\mu_k$ is at most 10%, and
- a small particle size raw material D which comprises at least one compound selected from a nickel compound, a cobalt compound and a manganese compound and which is a collection of many small particles having different particle sizes, wherein a particle size distribution function M(x) of a particle size x of a particle contained in the small particle size raw material D and having a particle size frequency M has a relation of the formula 9 (provided that in the formula 9, the median size $\mu_m$ is 0.1 µm≤$\mu_m$≤10 µm and the standard deviation $\sigma_m$ is 1.165≤$\sigma_m$≤1.65), a particle size distribution function S(x) of a particle size x of a particle contained in a small particle size raw material D' after the small particle size raw material D is pressed by 1.92 t/cm$^2$ and having a particle size frequency S has a relation of the formula 10 (provided that in the formula 10, the median size $\mu'_m$ is 0.1 µm≤$\mu'_m$≤10 µm and the standard deviation $\sigma'_m$ is 1.16≤$\sigma'_m$≤1.65), and the rate of change of the median size $\mu'_m$ relative to $\mu_m$ is at least 20%,
so that their weight mixing ratio would be within a range of from 90:10 to 50:50, then mixing a lithium compound thereto to obtain a mixture, and firing the mixture at a temperature of from 700 to 1,050° C., $$K(x) = \frac{1}{\sqrt{2\pi}\,\sigma_k x}\exp\left\{-\frac{(\log x - \mu_k)^2}{2\sigma_k^2}\right\} \quad \text{Formula 7}$$

$$R(x) = \frac{1}{\sqrt{2\pi}\,\sigma'_k x}\exp\left\{-\frac{(\log x - \mu'_k)^2}{2\sigma'^2_k}\right\} \quad \text{Formula 8}$$

$$M(x) = \frac{1}{\sqrt{2\pi}\,\sigma_m x}\exp\left\{-\frac{(\log x - \mu_m)^2}{2\sigma_m^2}\right\} \quad \text{Formula 9}$$

$$S(x) = \frac{1}{\sqrt{2\pi}\,\sigma'_m x}\exp\left\{-\frac{(\log x - \mu'_m)^2}{2\sigma'^2_m}\right\}. \quad \text{Formula 10}$$

13. A lithium ion secondary battery, comprising the cathode active material of claim 1.

14. The lithium ion secondary battery of claim 13, wherein the organic solvent comprises one or more of ethylene carbonate and diethyl carbonate, and the cathode active material further comprises LiPF$_6$.

* * * * *

UNITED STATES PATENT AND TRADEMARK OFFICE
CERTIFICATE OF CORRECTION

PATENT NO. : 10,424,777 B2
APPLICATION NO. : 14/533804
DATED : September 24, 2019
INVENTOR(S) : Satoshi Takamatsu et al.

Page 1 of 1

It is certified that error appears in the above-identified patent and that said Letters Patent is hereby corrected as shown below:

On the Title Page

Under "Related U.S. Application Data", (63):
"PCT/JP2013/066744, filed on May 18, 2013."
Should read:
--PCT/JP2013/066744, filed on June 18, 2013.--.

Signed and Sealed this
Twenty-first Day of April, 2020

Andrei Iancu
*Director of the United States Patent and Trademark Office*